United States Patent [19]
Bohman

[11] Patent Number: 5,791,022
[45] Date of Patent: Aug. 11, 1998

[54] CORD LOCKING MECHANISM

[76] Inventor: Lars Bohman, LGB Teknik Design AB Betzengatan 1, 414 55 Göteborg, Sweden

[21] Appl. No.: 786,346

[22] Filed: Jan. 23, 1997

[51] Int. Cl.[6] .............................. A44B 17/00; F16G 11/00
[52] U.S. Cl. ....................... 24/130; 24/129 R; 24/115 R; 24/122.6
[58] Field of Search ..................... 24/115 R, 115 A, 24/122.6, 127, 129 R, 129 D, 129 W, 130, 265 EC

[56] References Cited

U.S. PATENT DOCUMENTS

| | | | |
|---|---|---|---|
| 269,399 | 12/1882 | Ensign | 24/130 |
| 483,771 | 10/1892 | Seymore | 24/130 X |
| 666,400 | 1/1901 | Tregoning | 24/129 R |
| 1,452,338 | 4/1923 | Flowers | 24/130 |
| 1,970,752 | 8/1934 | Hughes | 24/129 R X |
| 2,952,206 | 9/1960 | Becksted | 24/129 R X |
| 3,066,372 | 12/1962 | Parker | 24/129 R X |
| 3,321,816 | 5/1967 | Monroe | 24/130 |
| 4,914,792 | 4/1990 | Bradt | 24/130 X |
| 4,939,820 | 7/1990 | Babcock | 24/129 R |
| 5,014,459 | 5/1991 | Sublet | 24/129 R X |
| 5,249,337 | 10/1993 | Cross et al. | 24/129 R |

FOREIGN PATENT DOCUMENTS

| | | | |
|---|---|---|---|
| 22680 | 11/1882 | Germany | 24/130 |
| 482722 | 9/1929 | Germany | 24/130 |

Primary Examiner—Randolph A. Reese
Assistant Examiner—Robert J. Sandy
Attorney, Agent, or Firm—Jeffrey Slusher

[57] ABSTRACT

The invention relates to an apparatus (1) for locking a cord (2), a wire, a tube or any other bendable member into a locking position with a locking portion. The locking portion (3) has at least one open slits shaped receiving cavity (5) defined at one end of the locking portion, the cavities having an opening that is facing away from a portion (7) of the cord that is under tension and the cavity having a width that is less than a diameter of the cord so that the portion (7) that is under tension and a portion (8) of the cord that is received within the receiving cavity are substantially perpendicular to one another.

9 Claims, 4 Drawing Sheets

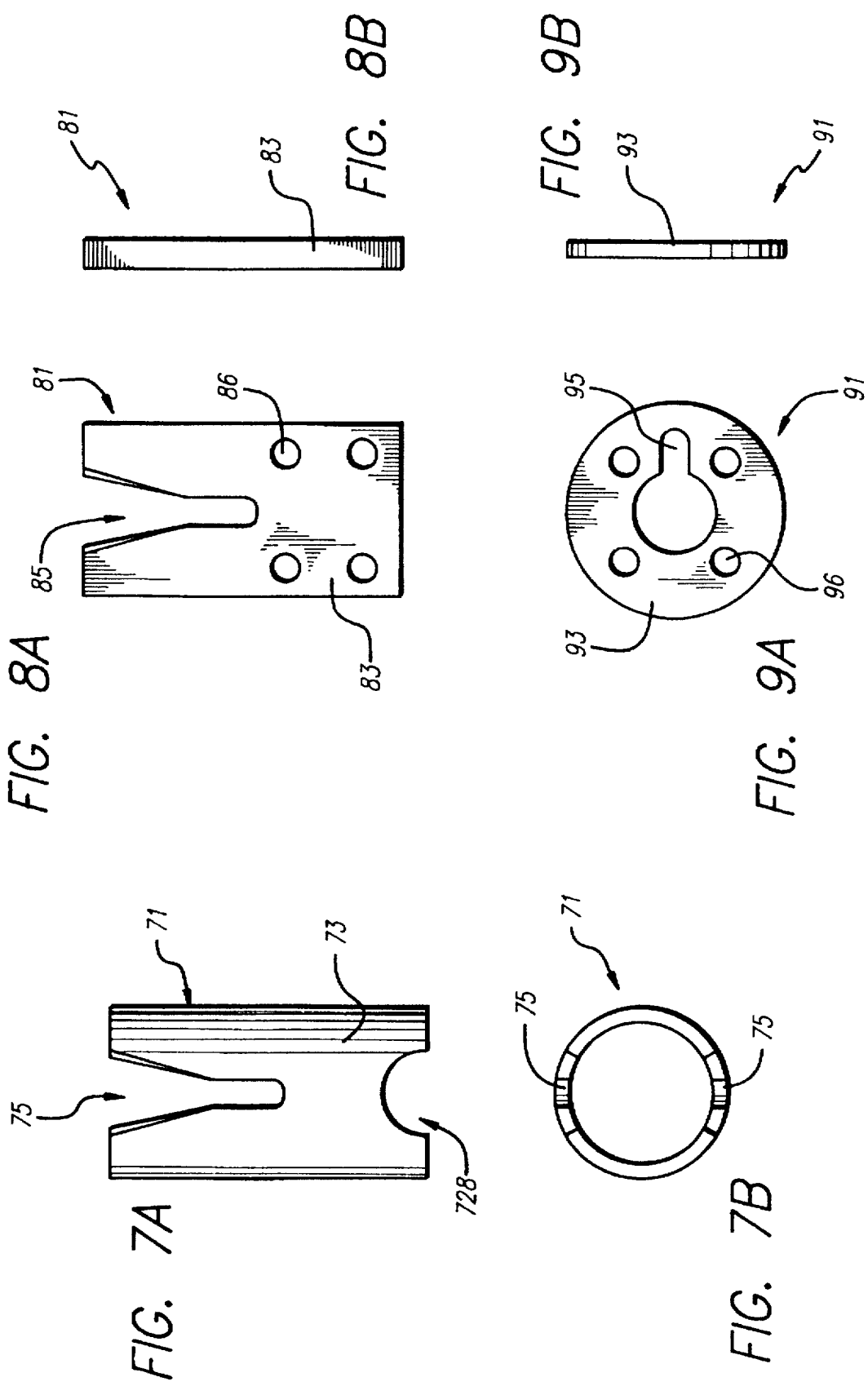

5,791,022

1

CORD LOCKING MECHANISM

TECHNICAL FIELD

The present invention refers to an apparatus for locking a cord, a wire, a tube or another flexible member by locking the member into a position with a locking portion.

BACKGROUND AND SUMMARY OF THE INVENTION

Cord locking mechanisms of the prior art that are, among other things, used in clothing, such as jackets, and outdoor equipment such as tents, tube holders, wire attachments are not able to effectively lock bendable members in an effective and secure way and wherein the locking mechanism is simple and functional. For example, the cord locks that are on the market lock the ends of the cord by a variety of types of spring mechanisms that press together a movable clutch mechanism against a solid backstop. Preferably, both ends of the cord are received in a gap defined between the clutch mechanism and the solid background. In this way they work as a friction based locking apparatus wherein the locking force is dependent upon the force of the spring. Because it is preferred that both ends of the cord are inserted through a common opening when they are locked and the cord ends are pressed together by the spring bolt that is parallel therewith, the thickest part of the cord will be locked tight more effectively that the thinner cord portions having different diameters. Furthermore, the force of the spring of the locking mechanism cannot so great that it is difficult to press together the spring bolt between the index finger and the thumb to release a cord that is locked tight. The locking force is therefore very limited with the result that the spring bolt may glide along the cord when the cord is under load.

A locking mechanism having a spring biased bolt includes at least three moving parts which may fail if they become dirty or are affected by the weather such as cold, rain, snow and ice.

The main object of the present invention is therefore to firstly provide a solution to the above described problem by an apparatus that does not have any moving parts and that is suitable for locking other bendable members such as tubes, wires etc.

The object is accomplished by providing an apparatus according the present invention that can mainly be characterized by a locking portion having an open slit shaped receiving cavity disposed at one end thereof. The opening is directed in a direction away from the part of the cord that is under tension and the opening has a width that is less than the diameter of the cord. In this way, the part of the cord that is under tension and the part of the cord that is received in the receiving cavity are substantially perpendicular to one another.

BRIEF DESCRIPTION OF THE DRAWINGS

A plurality of preferred embodiments of the invention are described below with reference to the following figures.

2

Figures 3A, 3B:
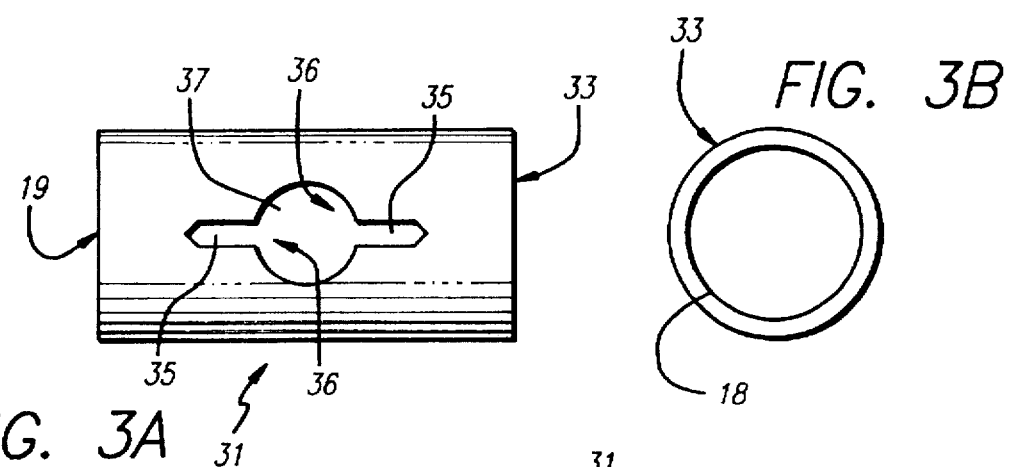
Figure 4:
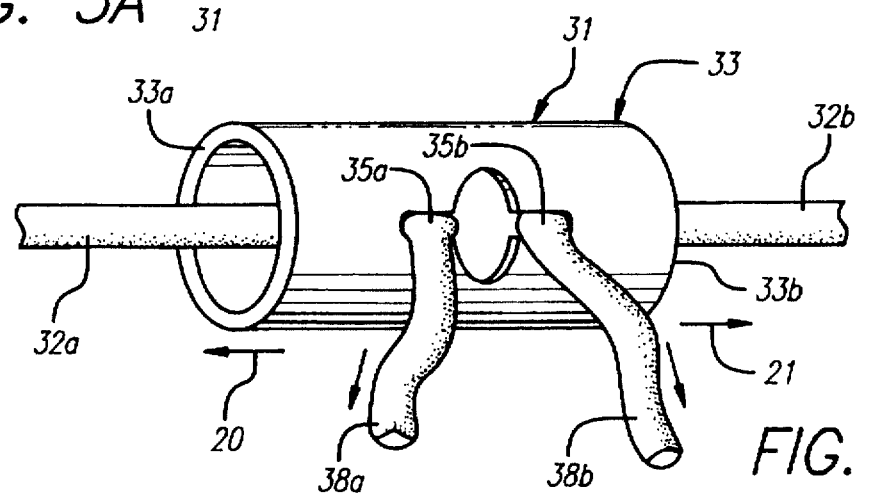
Figure 5:
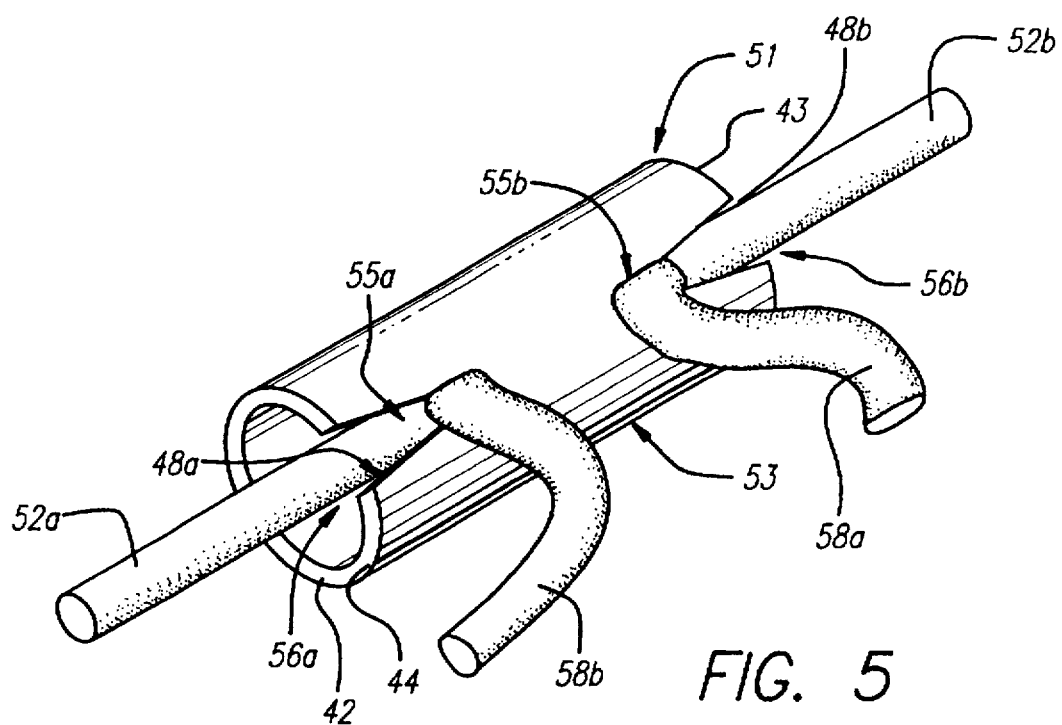
Figure 6:
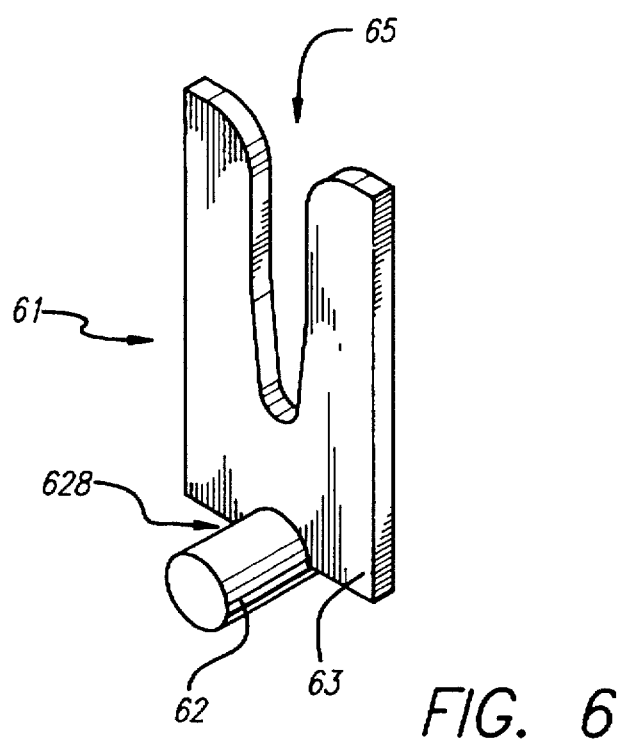

FIG. 3A shows a front view of a third embodiment of the cord locking mechanism of the present invention that is adapted to lock cords that are connected, FIG. 3B shows an end view of a third embodiment of the cord locking mechanism of the present invention that is adapted to lock cords that are connected FIG. 4 shows the third embodiment having two cords in a locked position, FIG. 5 shows a perspective view of a fourth embodiment of the cord locking mechanism of the present invention that is adapted to lock two cord portions together wherein the cord portions extend away from one another, and FIG. 6 shows a fifth embodiment of the cord locking mechanism of the present invention.

FIG. 7A is an elevational front view of a sixth embodiment of the locking mechanism of the present invention.

FIG. 7B is a top view of the sixth embodiment.

FIG. 8A is a elevational front view of a seventh embodiment of the locking mechanism of the present invention.

FIG. 8B is a side view of the seventh embodiment shown in FIG. 8a.

FIG. 9A is a top view of an eight embodiment of the locking mechanism of the present invention.

FIG. 9B is a side view of the eight embodiment shown in FIG. 9a.

DETAILED DESCRIPTION

The present invention refers to an apparatus 1 for locking a cord 2, a wire, a tube, for example, a high pressure tube for pneumatic or any other bendable member. The member is locked into a desired locking position with a locking portion 3 having at least one open slits shaped receiving cavity 5 defined at one end 4 thereof. The cavity 5 is adapted to lock the cord 2 in a locking position L.

The cord receiving cavity 5 has an opening 6 that is turned in a direction 11 and faces away from a portion 7 of the cord that is under tension and the cavity has a width V that is less than a diameter D of the cord 2. Thus, the portion 7 of the cord that is under tension and the portion 8 of the cord that is received in the cord receiving cavity 5 are substantially perpendicular to one another.

With the cord locking mechanism 1 of the present invention the cord 2 is locked without using any moving parts by placing the cord 2 in the opening 16 of the cord receiving cavity 5. The loose cord portion 8 is simultaneously pulled in the cavity 5 in a downward longitudinal direction 9 against a bottom 10. The cord is instantly locked in this way and is held in the locked position L until it is desirable to release the cord by performing the movements in the opposite direction, that is, by pulling the portion 8 of the cord 2 upwardly in the direction 11 that is opposite the downward direction 9.

To make it easier to insert the cord into the cord receiving cavity 5, the cavity has a chamfered portion 12 that is widened in the direction of the opening 16 and the portion 12 has a width X that is greater than the diameter D of the cord 2. Additionally, the chamfered portion 12 has diverging side walls 13A, 13B at the receiving cavity 5.

The thickness T of the apparatus at the receiving cavity 5 is preferably less than about 75% of the diameter D of the cord.

The cord is effectively locked by forming the receiving cavity 5 with parallel walls 14A, 14B at the bottom 10 of the cavity. The parallel walls have a length B that at least corresponds to the diameter D of the cord and the cavity has a width V that is about 50% of the diameter D of the cord 2.

As shown in the figures, the locking part is preferably a cylinder shaped body 3 having the receiving cavity 5 disposed at one mouth 15 at the opening 6 of the body 3. A locking mechanism that has one groove defined therein can lock a cord end portion 8 to prevent the cord 2, or any other suitable bendable member, from being pulled through the apparatus.

Figure 1:
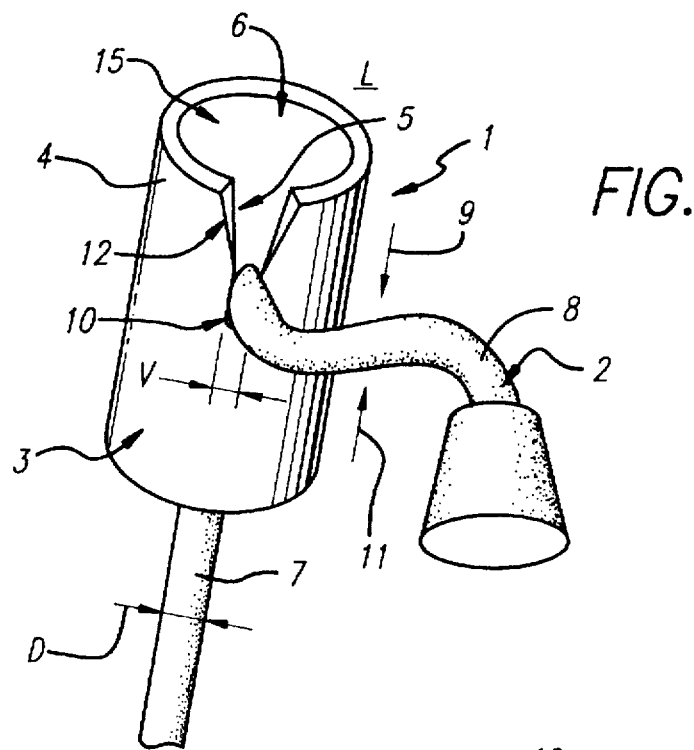
FIG. 1 shows a first preferred embodiment of the cord locking mechanism of the present invention including a cord locked therein.
Figure 1A:
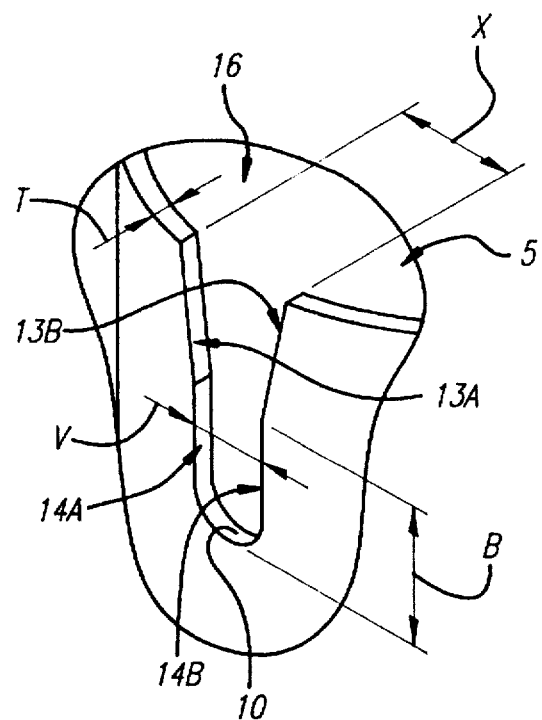
FIG. 1A shows an enlarged view of a portion of the groove shaped receiving cavity of a locking portion.
Figure 1B:
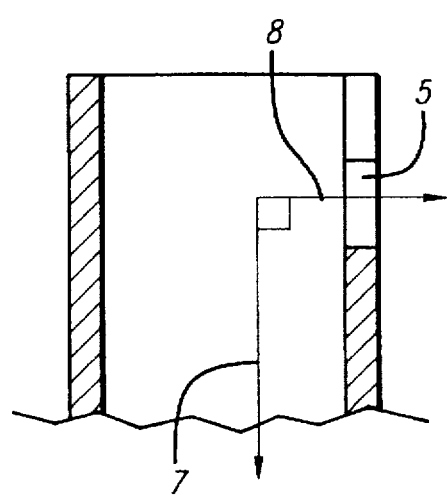
FIG. 1B shows a cross sectional view of a locking portion through the receiving cavity.
Figure 2:
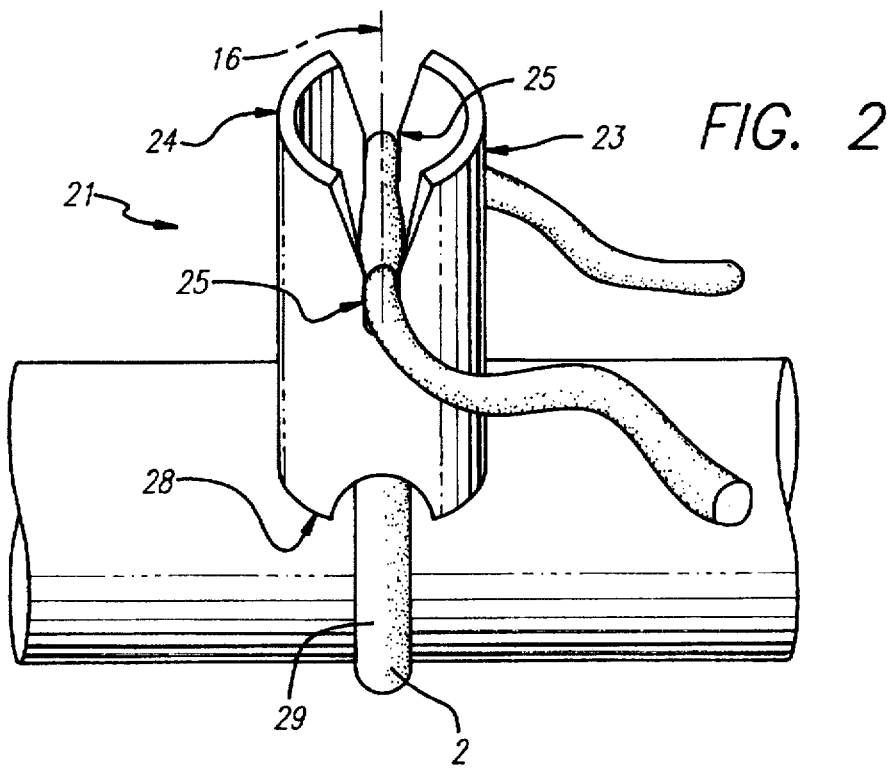
FIG. 2 shows a second embodiment of the cord locking mechanism of the present invention including two cord ends locked therein.

As shown in FIG. 2, a pair of receiving cavities 25 may be disposed at a common end portion 24 of the locking portion 23 so that the cavities are diametrically opposed and extend along a plane 16 that is parallel to the longitudinal axis of the diameter of the body.

The length of the receiving cavities is preferably about half the length of the body. FIGS. 3A–4 show a locking mechanism that, for example, may be used to connect separate cords 32a, 32b. The locking mechanism is formed by a cylinder shaped body 33 having a pair of receiving cavities 35a, 35b that are disposed in an aligned fashion and the openings 36 at the mouth of the cavities extend toward a common aperture 37 that extends completely through a wall 18 of the body 33. The cord 32a is inserted through an opening 19 defined in the body 33 whereas the other cord 32b, or the same cord 32a that has been bent outside and about the body 33, is inserted so that the portion 38a, 38b extend through the aperture 37 of the body 33 from an inside thereof. Thereafter, the portions 38a, 38b are pulled in the direction 20, 21 against the ends of the cylinders 33a, 33b so that the cords 32a, 32b are inserted into the openings 35a, 35b, respectively. In this way, the cords 32a, 32b are locked in an effective manner. This solution may not provide for the possibility of tensioning the cords to a desirable extent prior to locking the cords in place. A better solution is therefore shown in FIG. 5.

The locking mechanism 51 that is shown in FIG. 5 includes a cylinder shaped body 53 that has a slit shaped cord receiving cavity 55 defined at each end 42, 43 thereof. The cavities are preferably aligned to one another and include diverging parts 48a, 48b that are disposed at the mouth to make it easier to guide the cords 52a, 52b in through the openings 56a, 56b at the respective cavity 55a, 55b.

The cords 52a, 52b, are inserted from each end of the body 53 so that the portions 58b, 58a, respectively, are inserted into the cavities 55a, 55b, respectively. Preferably, one of the portions is pulled down to the bottom of the cavity and the remaining unlocked cord can then be put into tension by, for example, pulling it against the smooth surface of edge portion 44 of the body. The remaining cord is then inserted into the cavity when the desired tension of the cord is achieved and the cord is locked. Thus, an effective and safe locking is accomplished.

The release of the locking is performed by pulling the cord portion apart in a direction that is away from one another so that the cord is pulled out of the cavities 55 or so that at least one of the cords is removed from its locking position within the cavity.

FIGS. 6, 8 and 9 show similar locking mechanisms 61, 81, 91 with plane bodies 63, 83, 93 and simple cavities 65, 85, 95 having holes 86, 96 defined therein to attach the locking mechanism at a desired position.

FIGS. 2, 6 and 7 show cord locking mechanisms 21, 61 and 71 having recesses 228, 628 and 728 defined at one end of the bodies 31, 61, 71 of the locking mechanisms. The recesses are adapted to receive the cord therein at an end of the body that is remote from the receiving cavities 25, 65.

FIG. 2 shows the locking mechanism 21 that enables a loop 29 to be made by the cord 22 to, for example, bundle together a plurality or wires or to attached other things to one another.

The invention is not limited to the above description and to the drawings of the preferred embodiments but can be modified freely within the scope of the patent claims without departing from the scope of the invention.

The locking of the cord/cords can naturally be performed by inserting both cords in the same cavity.

I claim:

1. An apparatus for locking a cord into a locked position, comprising:

a locking member having a first end and an opposite second end, both ends defining n opening extending through the locking member;

the locking member further having an open slit at the first end thereof;

the cord having a first end portion and an opposite second end portion, the cord having a diameter D;

the open slit being formed in the locking member and having:

an outermost diverging wall portion that has a greatest width that is greater than the diameter D;

a bottom wall portion with a minimum width that is less than the diameter D;

a central wall portion formed as substantially parallel, opposing side walls of the locking member and connecting the outermost diverging wall portion and the bottom wall portion, the opposing side walls having a substantially constant separation that is wider than the bottom wall portion;

the open slit being adapted to receive the first end of the cord through the outermost diverging wall portion, along the central wall portion, and at least partially disposed into the bottom wall portion thereby locking the cord; and the first end of the cord being substantially perpendicular to the second end of the cord when the first end of the cord is at least partially disposed within the bottom wall portion of the open slit.

2. The apparatus according to claim 1 wherein the locking member has a side wall thickness T adjacent the open slit that is less than 75% of the diameter D of the cord.

3. The apparatus according to claim 1 wherein the separation of the parallel side walls is about half the diameter D of the cord, the parallel side walls having a length B that is about the same or greater than the diameter D of the cord.

4. The apparatus according to claim 1 wherein the locking member is a cylinder shaped body and the open slit is defined immediately adjacent one end of the cylinder shaped body so that the open slit is facing away from the cylinder shaped body.

5. A cord locking device comprising:

a mainly cylindrical locking member having an outer wall, a mainly open interior within the outer wall, and at least a first open end for receiving at least one cord, each cord having a cord diameter and a first end and a second end;

a pair of substantially longitudinally extending slits formed in and through the outer wall of the locking member, each slit having:

a guiding wall portion that has a greater width that is greater than the cord diameter;

a bottom wall portion with a minimum width that is less than the cord diameter;

a central wall portion that is wider than the bottom wall portion and is formed as substantially parallel, opposing side walls of the locking member and connecting the outermost and innermost wall portions of the locking member;

each slit thereby being adapted to receive a respective one of the cords through the respective guiding wall portion, along the respective central wall portion, and at least partially into the respective bottom wall portion, the respective bottom wall portion and respective central wall portion together cooperate to thereby secure each cord in a locked position;

the first end of each secured cord, in the locked position, being substantially perpendicular to the second end of the cord.

6. A cord locking device as defined in claim 5, in which the pair of slits are parallel to each other and are formed at the first open end of the locking member, the guiding wall portion of each slit extending to and opening at the first open end of the locking member.

7. A cord locking device as defined in claim 6, in which both the first and a second end of the locking member are open and further including a second pair of slits that are parallel to each other and are formed at the second open end of the locking member, the guiding wall portion of each of the second pair of slits extending to and opening at the second open end of the locking member.

8. A cord locking device as defined in claim 5, in which the pair of slits are substantially co-linear, the guiding wall portions of each slit being joined to form a common receiving opening in the outer wall of the locking member, the central wall portions of each slit extending longitudinally opposite to each other, the guiding, central and bottom wall portions of each slit thereby being delimited at all points by the outer wall of the locking member.

9. An apparatus for locking a cord into a locked position, comprising:

a locking member having a first end and an opposite second end, both ends defining an opening extending through the locking member;

the locking member defining an open slit at the first end thereof, the open slit having a width;

the cord having a first end portion and an opposite second end portion, the cord having a diameter D that is greater than the width of the open slit;

the open slit being adapted to receive the first end of the cord having a bottom and parallel side walls extending upwardly therefrom so that the open slit has a width V between the parallel side walls that is about half the diameter D of the cord, the parallel side walls having a length B that is about the same or greater than the diameter D of the cord;

the first end of the cord being substantially perpendicular to the second end of the cord when the first end of the cord is disposed within the open slit.

* * * * *

UNITED STATES PATENT AND TRADEMARK OFFICE
CERTIFICATE OF CORRECTION

PATENT NO. : 5,791,022
DATED : August 11, 1998
INVENTOR(S) : Lars Bohman

It is certified that error appears in the above-identified patent and that said Letters Patent is hereby corrected as shown below:

On the title page insert item --[30] Foreign Application Priority Data
    January 29, 1996    Sweden................... 9600302-5 --.

Signed and Sealed this

Twentieth Day of July, 1999

Attest:

Q. TODD DICKINSON

*Attesting Officer*    *Acting Commissioner of Patents and Trademarks*